INVENTOR.
WILLIAM F. BARTLETT
BY George J. Seligsohn
ATTORNEY

Oct. 24, 1967 W. F. BARTLETT 3,349,379

STORED PROGRAM BOOLEAN LOGIC SYSTEM INCORPORATING OMNI-BOOLEAN FUNCTION SYNTHESIZER

Filed June 1, 1965

2 Sheets-Sheet 2

United States Patent Office 3,349,379

Patented Oct. 24, 1967

3,349,379

STORED PROGRAM BOOLEAN LOGIC SYSTEM INCORPORATING OMNI-BOOLEAN FUNCTION SYNTHESIZER

William F. Bartlett, Rochester, N.Y., assignor to Stromberg-Carlson Corporation, Rochester, N.Y., a corporation of Delaware

Filed June 1, 1965, Ser. No. 460,314

4 Claims. (Cl. 340—172.5)

Figure 1:
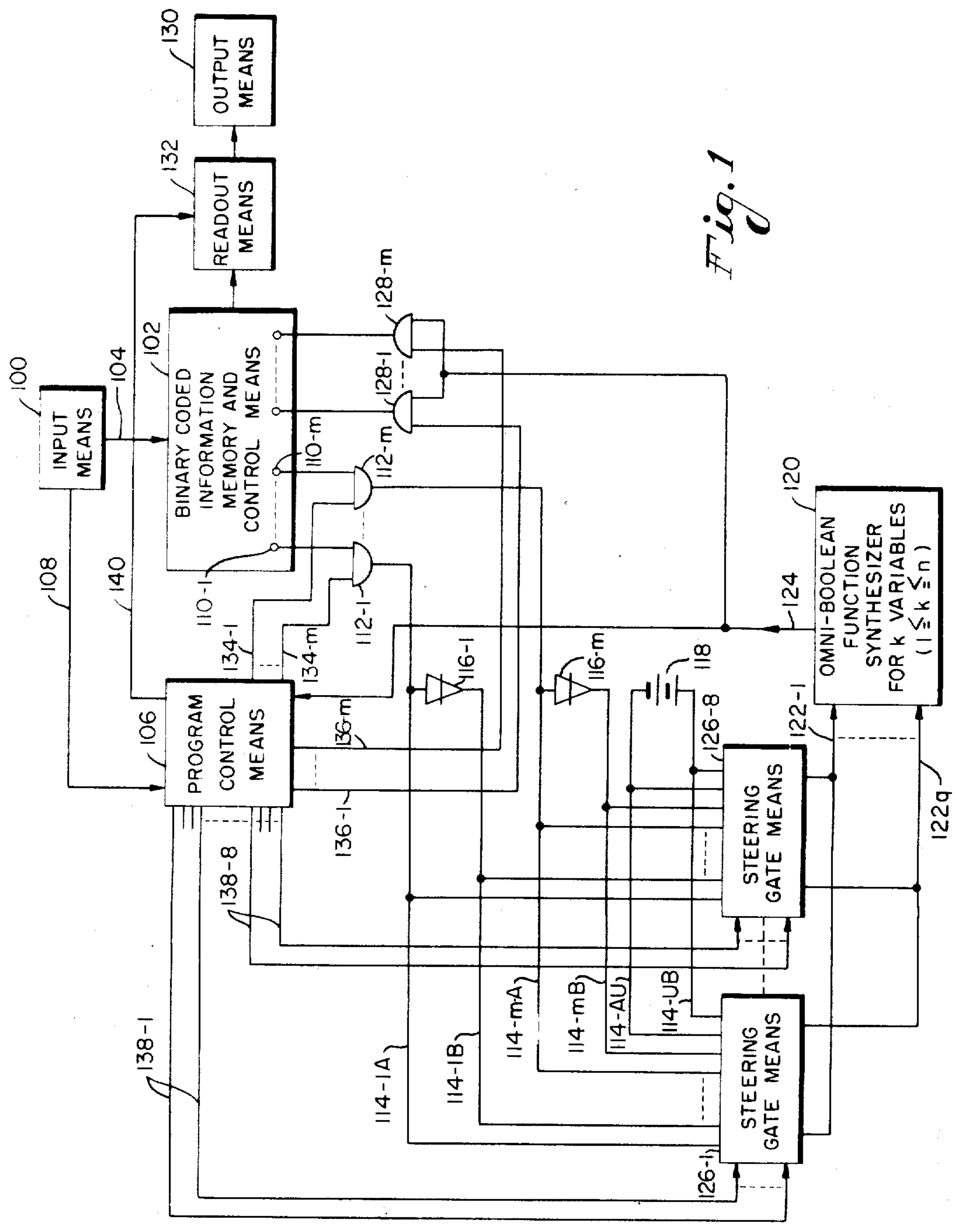

This invention relates to a data processing system and, more particularly, to a stored program Boolean logic system incorporating an omni-Boolean function synthesizer.

Most data processing systems in use today handle data in the form of binary bits and make use of Boolean logic in processing the data. The overall number of separate binary variables which a data processing system must handle, of course, depends upon the size and complexity of the system. In large and complex data processing systems, this overall number of binary variables may easily be several hundred. However, in the processing of data, most data processing systems operate in an essentially serial or sequential manner, so that the number of binary variables which are logically operated on at any one time is usually relatively small. Thus, although the overall number of separate binary variables utilized in a data processing system may be several hundred, in many cases the maximum number of variables which must be logically operated on at any one time may be as small as three, four or five.

The present invention contemplates a data processing system where the overall number of separate binary variables, hereinafter designated as $m$, is relatively large, but where the maximum number of binary variables which must be logically operated on at any one time, hereinafter designated as $n$, is relatively small. More particularly, the present invention makes use of an omni-Boolean function synthesizer for $k$ variables, where $k$ is greater or equal to 1 and less than or equal to $n$, together with stored program controlled gate means for sequentially steering $k$ selected ones of the $m$ overall system binary variables at any one time as an input to the omni-Boolean function synthesizer to obtain as an output or "answer" from the synthesizer at least one binary variable which is a selected function of the $k$ input variables applied as an input thereto. This output binary variable is fed back to at least one selected memory in the system by stored program controlled gate means. The output binary variable from the synthesizer is also utilized to affect the subsequent program control of the system.

It is, therefore, the principal object of the present invention to reduce the complexity and cost of sequentially programmed data processing systems by utilizing the same common generalized means for performing all function synthesizing within the system.

It is a more specific object of the present invention to provide in a data processing system capable of handling a large number of separate binary variables a common generlized Boolean function synthesizer capable of handling at any one time a maximum number of binary variables substantially smaller than the total number of system binary variables, which synthesizer has selective access to all the system binary variables on a time-shared basis.

Figure 2:
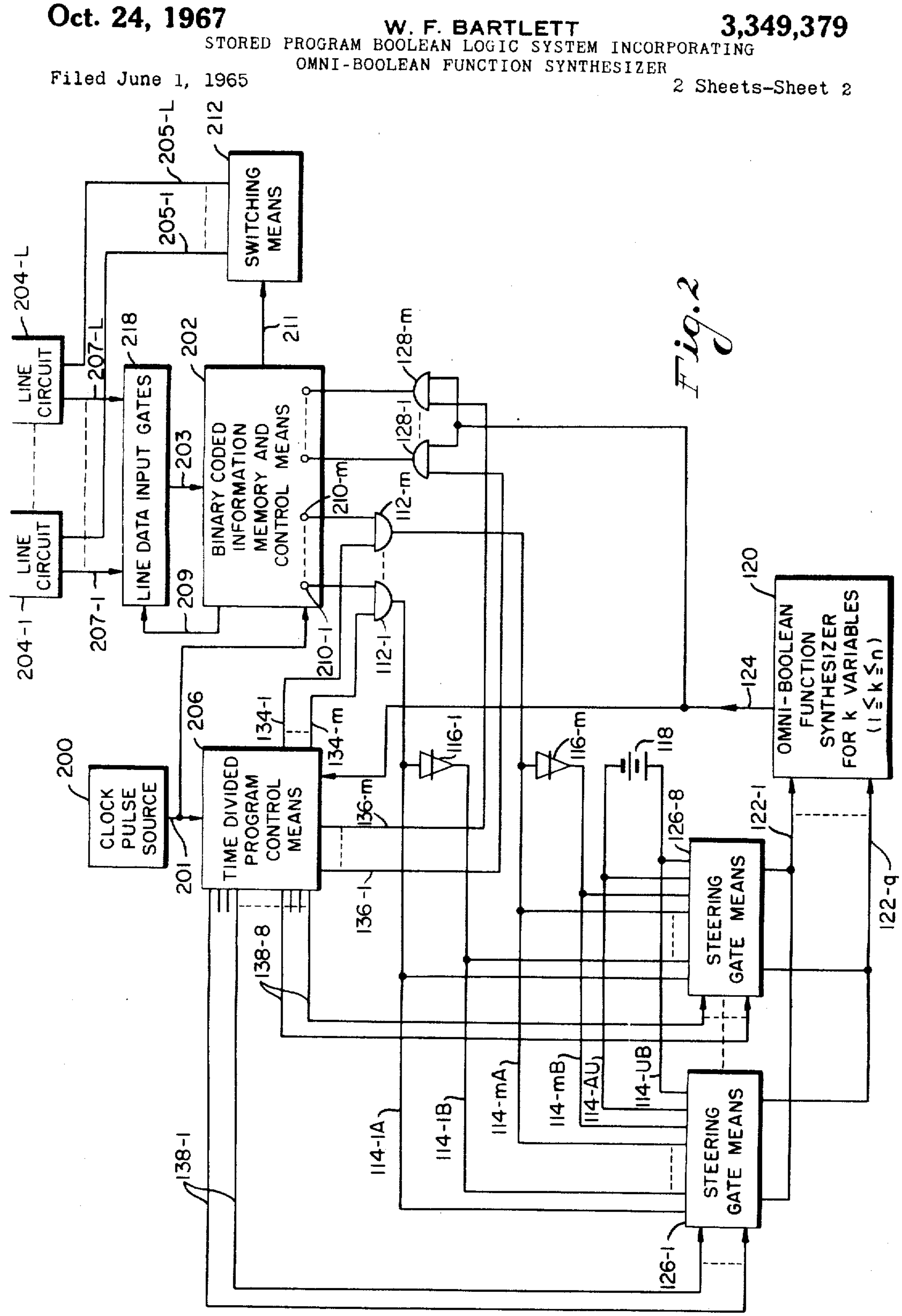

These and other objects, features and advantages of the present invention will become more apparent in the following detailed description, taken together with the accompanying drawings, in which:

FIG. 1 is a block diagram of a first preferred embodiment of the present invention; and FIG. 2 is a block diagram of a second preferred embodiment of the present invention.

Before referring to the drawings, reference is made to the publication, "Two-Dimensional Iterative Logic" (Report ESL–R–210, M.I.T. Project DSR 9891), by Rudd H. Canaday, published by the M.I.T. Industrial Liaison Office in September 1964.

The aforesaid publication is a learned work in which certain novel aspects of Boolean logic design are explored and developed in detail. However, for the purposes of the present invention, all that is important is that the aforesaid publication shows that it is possible to construct an array of simple Boolean logic elements permanently interconnected in a two-dimensional matrix which is capable of deriving at one output thereof any one of each and every Boolean function of $n$ or fewer binary variables applied as inputs thereto, the particular Boolean function derived at this one output thereof in any given case depending solely on the particular permutation of various possible arrangements in which the binary variables are applied to a predetermined plurality of the inputs of the array. Of course, the larger $n$ is, i.e., the larger the number of binary variables, the larger will be the size of the required array.

Although, in general, all the elements of the array need not be identical, the fact is that the vast majority and most useful arrays, disclosed in the aforesaid publication, are composed of identical elements.

In addition to an array including the aforesaid one output, which in all cases is the main output of the array, an array may also include one or more subsidiary outputs. For any given array having a subsidiary output, some particular predetermined Boolean function will be derived at a subsidiary output thereof at the same time as a certain particular Boolean function is being derived at the main output of the array. It is usually possible to construct an array so that a desired Boolean function, or at least its complement, is derived at a subsidiary output of an array when a certain particular Boolean function is being derived at the main output of the array.

Since a larger array, capable of handling a relatively large maximum number of binary variables, can be considered as made up of a plurality of interconnected smaller subarrays, each capable of handling a smaller number of binary variables, it is possible to provide a plurality of relatively small subarrays, which at times may be utilized separately in a parallel logic arrangement to derive at one time a plurality of independent Boolean functions each of which is obtained from a different subarray and which is a function of no more than the maximum number of binary variables which can be accommodated by the subarray from which it is derived, and yet at other times to provide a large array which is capable of handling a greater number of binary variables by selectively interconnecting some or all of the subarrays.

The present invention envisages in practical systems the use of omni-Boolean function synthesizers providing subsidiary outputs, described above, and those composed of selectively interconnectable subarrays, as described above, as well as the more straightforward omni-Boolean function synthesizer providing only a single output. However, for illustrative purposes and in order not to obscure the essence of the present invention, the omni-Boolean function synthesizer incorporated in the preferred embodiments shown in FIGS. 1 and 2 is limited to one providing only a single output.

Referring now to FIG. 1, it will be assumed, for illustrative purposes, that the system disclosed therein is an electronic desk calculator, although more complex data processing systems than a desk calculator could in corporate the features of the system shown in FIG. 1.

As shown in FIG. 1, input means 100, which may consist of the various keys of a desk calculator, supplies numeric input data in binary form to binary coded information memory and control means 102 over connection 104, which may actually consist of one or more conductors, where it is stored in input registers therein, which may take the form of a recirculating delay line, magnetic cores, or any other well known binary data storage means. Input means 100 also applies information to program control means 106 over connection 108, which may consist of one or more conductors. In the case of a desk calculator, the information applied over connection 108 defines the type of operation to be performed, such as addition, subtraction, multiplication, division, etc. Program control means 106 includes one or more stored sequential programs, an appropriate one of which is rendered operational in response to the particular infomation applied thereto over connection 108. The instructions contained in the stored sequenced program or programs in program control means 106 may have loops, alternative branches, etc., as is customary in stored program technology.

Binary coded information memory and control means 102 includes output terminals 110–1 . . . 110–*m*, one output terminal being provided for each of the *m* system binary variable. Each of these output terminals has access to an individual one of the many registers included in binary coded information memory and control means 102. The presence of a binary "1" on any of output terminals 110–1 . . . 110–*m* is manifested by a certain potential level and the presence of a binary "0" at any one of the output terminals 110–1 . . . 110–*m* is manifested by a different potential level. For instance, if negative logic is used, a binary "1" would be manifested by a negative potential level, while a binary "0" would be manifested by either a ground potential level or a positive potential level. If positive logic were utilized, the potential levels employed to manifest a binary "1" and a binary "0" would be reversed.

Each of the *m* binary variables has an individual one of normally closed AND gates 112–1 . . . 112–*m* corresponding thereto which has the corresponding one of output terminals 110–1 . . . 110–*m* coupled as a first input thereto. Each of the *m* variables has individual highways 114–1A . . . 114–*m*A corresponding thereto which is coupled to the output of that one of AND gates 112–1 . . . 112–*m* corresponding therewith.

Corresponding with each one of highways 114–1A . . . 114–*m*A is a corresponding highway 114–1B . . . 114–*m*B which is coupled thereto through the one of inverters 116–1 . . . 116–*m* corresponding therewith. Thus, in response to the opening of any of AND gates 112–1 . . . 112–*m*, that one of highways 114–1A . . . 114–*m*A will manifest the value of the binary variable then present on that one of output terminals 110–1 . . . 110–*m* corresponding therewith, while the corresponding one of highways 114–1B . . . 114–*m*B will manifest the complement of this binary variable.

Although not shown, it is possible for binary coded information memory and control means 102 to include an individual bistable device, such as a flip-flop, for each binary variable, having one side thereof coupled to that one of output terminals 110–1 . . . 110–*m* corresponding to that binary variable. In this case, a second set of output terminals, similar to output terminals 110–1 . . . 110–*m*, may be coupled to the other side of the flip-flop, and a second set of AND gates, similar to AND gates 112–1 . . . 112–*m*, may be utilized instead of inverters 116–1 . . . 116–*m* to forward the completment of the respective binary variables to highways 114–1B . . . 114–*m*B. However, the total structure required to accomplish this is greater than that required by the use of inverters 116–1 . . . 116–*m*, as shown in FIG. 1, to provide the complement of the binary variables on highways 114–1B . . . 114–*m*B.

In addition to the highways 114–1A . . . 114–*m*A, to which the *m* binary variables are applied, and the highways 114–1B . . . 114–*m*B, to which the complements of the *m* binary variables are applied, there exist highways 114–UA and 114–UB, which, as shown in FIG. 1, are connected to opposite ends of a fixed voltage source 118. Fixed voltage source 118 applies a potential level to highway 114–UA which manifests a permanent binary value of "1" and applies a potential level to highway 114–UB which manifests a permanent binary value of "0."

It will therefore be seen that the total number of highways is equal to $2m+2$.

Further shown in FIG. 1 is omni-Boolean function synthesizer for *k* variables 120, where ($1 \leqq k \leqq n$) and where *n* is smaller than *m*. Function synthesizer 120, which may comprise a two-dimensional iterative array of logic elements, such as is fully disclosed in the aforesaid Canaday publication, includes a set of separate inputs 122–1 . . . 122–*q*, where *q* is dependent upon the size and particular configuration of the two-dimensional iterative array, and a single output 124.

Coupled to each individual one of the set of inputs 122–1 . . . 122–*q*, as shown in FIG. 1, is the output from the corresponding one of steering gate means 126–1 . . . 126–*q*. The highways 114–1A . . . 114–*m*A, 114–1B . . . 114–*m*B, 114–UA and 114–UB are coupled, as shown in FIG. 1, as inputs to each of steering gate means 126–1 . . . 126–*q*.

As shown in FIG. 1 output 124 from function synthesizer 120 is applied as an input to program control means 106 and is also applied in common as a first input to normally closed AND gates 128–1 . . . 128–*m*, each of which corresponds with a separate one of the *m* system variables. The output from each of AND gates 128–1 . . . 128–*m* is separately applied as an input to binary coded information memory and control means 102, where it has access to a register therein corresponding to that one of the *m* binary variables.

Further included in FIG. 1 is output means 130, which in the case of an electronic desk calculator may be the display means, which has its input coupled to an output from binary coded information memory and control means 102 by normally disabled readout means 132.

Program control means 106 is utilized to control the opening of a selected one of AND gates 112–1 . . . 112–*m*, to control the opening of a selected one of AND gates 128–1 . . . 128–*m*, to control each respective one of steering gate means 126–1 . . . 126–*q* to effect the coupling of the respective output thereof to a selected individual one of the highways 114–1A . . . 114–*m*A, 114–1B . . . 114–*m*B, 114–UA and 114–UB coupled as inputs thereto, and for enabling readout means 132. More particularly, a set of output conductors 134–1 . . . 134–*m*, emanating from program control means 106, are individually coupled as second inputs to corresponding ones of AND gates 112–1 . . . 112–*m*. A set of output conductors 136–1 . . . 136–*m*, emanating from program control means 106, are individually coupled as second inputs to corresponding ones of AND gates 128–1 . . . 128–*m*. An individudal one of a plurality of sets of conductors 138–1 . . . 138–*q*, emanating from program control means 106, is connected as a control input to a corresponding one of steering gate means 126–1 . . . 126–*q*. A readout enabling output from program control means 106 is coupled to readout means 132 over conductor 140.

Considering now the operation of the system shown in FIG. 1, input means 100 applies input data to one or more registers in binary coded information memory and control means 102 over connection 104, and applies a selective signal over connection 108 to program control means 106 to select and start the operation of a particular one of a plurality of programs, or at least to start the operation of a single program, in case program control means 106 includes only a single program, As stated above, input means 100 may be the keyboard of an electronic desk calculator, for instance.

Program control means 106, in accordance with the information received thereby over connection 108, reads out information stored in the first step of the selected program. In accordance with this first step read out information from program control means 106, a selected one or more of normally closed AND gates 112–1 . . . **112–*m* is opened, and simultaneously therewith each of steering gate means 126–1 . . . 126–*q* is selectively operated to forward a connection from a selected one of highways 114–1A . . . 114–*m*A, 114–1B . . . 114–*m*B, 114–UA or 114–UB, in accordance with the first step read out information, to the respective output of that steering gate means, to thereby apply a selected input to omni-Boolean function synthesizer 120. Further, a selected one or more of normally closed AND gates 128–1 . . . 128–*m* is opened, in accordance with the first step read out information from program control means 106. All this results in synthesizer 120 producing at output 124 a binary bit which is a particular Boolean function, determined by the first step read out information from program control means 106, of the particular ones of binary variables appearing at output terminals 110–1 . . . 110–*m* which correspond with those AND gates 112–1 . . . 112–*m* which were opened in accordance with the first step read out information from program control means 106. The binary bit appearing at output 124 of synthesizer 120 is forwarded to one or more registers in binary coded information memory and control means 102 which are determined by the one or ones of AND gates 128–1 . . . 128–*m* which were opened by the first step read out information from program control means 106**.

In addition, the binary bit at output 124 of synthesizer 120 is fed back to program control means 106 to effect the reading out of information stored in another step of the selected program of control means 106. This other step may be independent of the binary value of the binary bit appearing at output 124 of synthesizer 120, or, in the alternative, its choice may depend upon the binary value of the binary bit at output 124 of synthesizer 120, depending upon the information contained in the selected stored program of program control means 106. For instance, the selected stored program of program control means 106 may include, as is conventional in stored program technology, loops and/or branches, where the choice of the next step may depend upon the "answer" of the previous step manifested by the binary value of the binary bit appearing at output 124 of synthesizer 120 during the previous step.

The whole process described above in connection with the first step of the selected stored program will be repeated for each successive step. In this manner, all the information will be sequentially processed by synthesizer 120 in the proper order and stored in proper ones of the registers included in binary coded information memory and control means 102. During the last step of the selected stored program of program control means 106, read out means 132 will be enabled to forward information stored in certain registers of binary coded information memory and control means 102 to output means 130, which may be display means, for instance.

The system shown in FIG. 2 is basically similar to that shown in FIG. 1, but differs therefrom in several significant ways. More particularly, while the system shown in FIG. 1 is most useful as a form of computer, such as an electronic desk calculator, the system shown in FIG. 2 is most useful in the form of a time-divided multiplex telephone system. In FIG. 2, those elements which are identical in structure and function to those shown in FIG. 1, namely, AND gates 112–1 . . . **112–*m*, inverters 116–1 . . . 116–*m*, fixed voltage source 118, omni-Boolean function synthesizer 120, steering gate means 126–1 . . . 126–*q*, AND gates 128–1 . . . 128–*m***, and the various connections and highways interconnecting these elements, have been given the same reference numerals as the corresponding elements shown in FIG. 1.

Referring now to FIG. 2, there is shown a plurality of line circuits 204–1 . . . 204–L which are individually coupled to switching means 212 over connections 205–1 . . . 205–L, which individually correspond to each of the line circuits. Each of line circuits 204–1 . . . 204–L is individually coupled as an input to normally closed line data input gates 218 over connections 207–1 . . . 207–L corresponding individually to each of the line circuits. A common output from line data input gates 218 is applied as an input to binary coded information memory and control means 202 over connection 203.

Clock pulses from clock pulse source 200 are applied as an input to both binary coded information memory and control means 202 and time-divided program control means 206 over connection 201. A first control output from binary coded information memory and control means is coupled to line data input gates 218 over connection 209 and a second control output from binary coded information memory and control means 202 is coupled to switching means 212 over connection 211. The remaining structure shown in FIG. 2 is identical in structure and function as that shown and described in connection with FIG. 1.

Before discussing the operation of the system shown in FIG. 2, time-divided multiplex telephone systems in general will be discussed briefly. In such systems, a repetitive time frame which includes a predetermined number of time slots is established. An idle time slot is employed to cyclically sample each line circuit in sequence to determine whether a line circuit being sampled is or is not in an off-hook condition. When a particular line circuit is found to be in an off-hook condition, a busy test is made to determine whether that line circuit has already been granted service. If it is found that this particular line circuit has already been granted service, the next line circuit in the sequence is sampled in the same idle time slot to determine if it is off-hook, and the aforesaid process is repeated for this next line circuit. However, if the busy test shows that the particular line circuit which is in an off-hook condition is not busy, this is an indication that this particular line circuit is a newly calling line requesting service. In this case, the idle time slot is assigned to this particular line circuit and dial tone is returned thereto. Since in this case the idle time slot has now been assigned to a particular line, a new idle time slot in the time frame is selected for the sampling of the next line circuit in the sequence to determine if it is in an off-hook condition.

After any newly-calling line circuit is assigned a particular time slot, the on-hook or off-hook condition of that line circuit is sampled during each successive time frame in that particular time slot to provide an indication of the presence of dial pulses and interdigital pauses, and this information is registered. In this manner, the directory number of a called line circuit is obtained and stored. At this stage in the setting up of a telephone connection, the stored directory number of the called line circuit is utilized to operate switching means to extend a connection to the called line circuit, preferably in the same time slot as assigned to the calling line circuit. A busy test of the called line circuit is then made and if the called line circuit is found to be busy, busy tone is returned to the calling line circuit; while if the called line circuit is found to be idle, a ring signal is applied to the called line circuit. This ring signal is removed upon the answer of the called line circuit and a conversation path between the calling and called line circuits is established over the extended connection. At the end of the conversation, which is indicated by the presence of an on-hook signal for more than a predetermined time, the switching means extending the connection is restored and the connection is broken.

In some time-divided multiplex telephone systems, time-division multiplex techniques are utilized solely for extending the connection, but not for transmitting the voice signal, while in other such systems time-division multiplex techniques are utilized both for extending the connection and for transmitting the voice signal. In any case, it will be seen from the above brief summary of the events which take place in a time-divided multiplex telephone system that these events follow a predetermined program of sequential logical steps. This makes the present invention useful in time-divided multiplex telephone systems.

Referring now to the operation of the time-divided multiplex telephone system shown in FIG. 2, clock pulses from clock pulse source 200, which are applied to both time-divided program control means 206 and to binary coded information memory and control means 202, are utilized to establish therein the repetitive time frame consisting of a predetermined number of time slots. Time-divided program control means 206 includes means, such as a recirculating delay line, for instance, for keeping track of the particular step achieved in the overall sequence of predetermined steps necessary for setting up a telephone call in each one of the respective separate time slots. Similarly, binary coded information memory and control means 202 includes means, such as a recirculating delay line, for instance, for applying a signal over connection 209 to line data input gates 218 for permitting a sampling during any time slot of the proper single one of line circuits 204–1 . . . 204–L of the on-hook or off-hook condition of that line circuit, and the registration in binary coded information memory and control means 202 of this information. In addition, binary coded information memory and control means 202 includes counters for counting clock pulses applied thereto in order to indicate and discriminate between various time intervals, such as a dial pulse interval, interdigital pause interval, or final on-hook interval.

All this input information plus derived information is stored in binary form in various registers in binary coded information memory and control means 202, each of which has access to a separate one of terminals 210–1 . . . **210–*m***.

Time-divided program control means 206, in accordance with the particular step which has been achieved in setting up a telephone call in any particular time slot, will, during that particular time slot of the next occurring time frame, in accordance with its stored program, open the appropriate ones of AND gates 112–1 . . . **112–*m* and AND gates 128–1 . . . 128–*m*, as well as operate in the appropriate manner each of steering gate means 126–1 . . . 126–*q*, to permit synthesizer 120 to perform the then required logical operation on the data applied thereto. Output 124, the "answer" from synthesizer 120, will be fed back both to the proper register in binary coded information memory and control means 202 and to time-divided program control means 206 where it will advance the program for that particular time slot in time-divided program control means 206**, so that during the next subsequent time frame the next required logical operation will be performed in that particular time slot.

When the appropriate step is reached in the program in any time slot where the complete directory number of the called line circuit is registered in binary coded information memory and control means 202, binary coded information memory and control means 202 will control switching means 212 over connection 211 to effect a connection between the calling line circuit and the called line circuit.

Although only two preferred embodiments of data processing systems capable of handling a large number of separate binary variables employing a common generalized Boolean function synthesizer capable of handling at any one time a maximum number of binary variables substantially smaller than the total number of system binary variables, which synthesizer has selective access to all the system binary variables on a time-shared basis, have been shown and described in detail herein, there are many other specific data processing systems of the aforesaid type wherein the present invention may be advantageously employed. Therefore, it is not intended that the invention be restricted to these two preferred embodiments, but that it be limited only by the true spirit and scope of the appended claims.

What is claimed is:

1. A data processing system comprising binary coded information memory and control means including means for separately storing *m* binary variables, where *m* is a first plural integer; input means coupled to said binary coded information memory and control means for applying input binary data to said binary coded information memory and control means for storage therein; an omni-Boolean function synthesizer having a predetermined number of inputs and at least one output for producing at its output an output signal manifesting any Boolean function of a maximum of *n* binary variables, wherein *n* is a second integer smaller than *m*, in accordance with the binary values of signals applied to its respective inputs; first selectively-operated means coupled between said binary coded information memory and control means and said inputs to said synthesizer and having access to said *m* stored binary variables for selectively applying any of *m* binary variables, the complement thereof, a permanent binary "one" or a permanent binary "zero" to at least certain ones of said inputs of said synthesizer; second selectively-operated means coupled between the output of said synthesizer and said binary coded information memory and control means for selectively applying said output signal of said synthesizer to said means for separately storing *m* binary variables to effect the modification of at least certain ones of said *m* stored binary variables in response to the application of said output signal of said synthesizer thereto; a sequential step-by-step stored program control means coupled to said first and second selectively-operated means for controlling the selective operation thereof during each step of said program control means in accordance with the stored program in that step; and means for applying said output signal from said synthesizer to said program control means for controlling the stepping thereof in response thereto.

2. The system defined in claim 1, wherein said first selectively-operated means includes a set of *m* normally closed AND gates each of which corresponds with a different one of said *m* binary variables, means for applying as a first input to each respective one of said set of *m* AND gates the one of said *m* binary variables with which it corresponds from said binary coded information memory and control means, means for applying as a second input to each respective one of said set of *m* AND gates a separate control signal from said program control means to effect the selective opening thereof in response thereto, an individual pair of highways corresponding to each respective one of said set of *m* AND gates, means for coupling a first one of each pair of highways directly to the output of that one of said set of *m* AND gates which corresponds therewith, inverter means for coupling the second one of each pair of highways to the output of that one of said first of *m* AND gates which corresponds therewith, a D.C. voltage source, a first additional highway coupled to one side of said D.C. voltage source and a second additional highway coupled to the other side of said D.C. voltage source, an individual steering gate means corresponding with each individual input of said synthesizer, means for coupling all of said highways as a first set of inputs to each and every steering gate means, each steering gate means having a single output which is coupled to the input of said synthesizer with which it corresponds, and means for applying a separate control signal from said program control means as a second input to each respective steering gate means to selectively interconnect solely any one of said highways with the output of each respective steering gate means in accordance with the information contained in the control signal applied as a second input to that steering gate means.

3. The system defined in claim 2, wherein said second selectively-operated means includes a second set of *m* normally closed AND gates each of which corresponds with a different one of said *m* binary variables, means for applying said output of said synthesizer as a first input to all of said second set of *m* AND gates, means for applying as a second input to each respective one of said second set of *m* AND gates a separate control signal from said program control means to effect the selective opening thereof in response thereto, and individual means for applying the output of each respective one of said second set of *m* AND gates to said means for separately storing *m* binary variables to effect the modification of that binary variable with which that AND gate corresponds.

4. The system defined in claim 1, wherein said program control means includes means for choosing in the alternative the step which immediately follows at least one particular step of said program control means as a function of the binary value manifested by the output from said synthesizer which is applied to said program control means during said particular step.

No references cited.

ROBERT C. BAILEY, *Primary Examiner.*

R. RICKERT, *Assistant Examiner.*